(12) United States Patent  (10) Patent No.: US 8,061,980 B2
Praisner et al.  (45) Date of Patent: Nov. 22, 2011

(54) SEPARATION-RESISTANT INLET DUCT FOR MID-TURBINE FRAMES

(75) Inventors: Thomas J. Praisner, Colchester, CT (US); Eunice Allen-Bradley, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 765 days.

(21) Appl. No.: 12/228,947

(22) Filed: Aug. 18, 2008

(65) Prior Publication Data

US 2010/0040462 A1  Feb. 18, 2010

(51) Int. Cl.
| | |
|---|---|
| *F01D 1/00* | (2006.01) |
| *F01D 25/24* | (2006.01) |
| *F01D 9/00* | (2006.01) |
| *F03B 1/00* | (2006.01) |
| *F03B 11/02* | (2006.01) |
| *F03B 3/00* | (2006.01) |
| *F03D 5/00* | (2006.01) |
| *F04D 1/00* | (2006.01) |
| *F04D 17/00* | (2006.01) |
| *F04D 23/00* | (2006.01) |
| *F04D 29/42* | (2006.01) |

(52) U.S. Cl. .................. 415/182.1; 415/208.1
(58) Field of Classification Search ............... 415/182.1, 415/208.1
See application file for complete search history.

(56) References Cited

U.S. PATENT DOCUMENTS

| | | |
|---|---|---|
| 2,735,612 A | 2/1956 | Hausmann |
| 5,758,488 A | 6/1998 | Batey |
| 6,017,186 A | 1/2000 | Hoeger et al. |
| 6,283,713 B1 | 9/2001 | Harvey et al. |
| 6,338,609 B1 | 1/2002 | Decker et al. |
| 6,488,470 B1 | 12/2002 | Owczarek |
| 6,619,030 B1 | 9/2003 | Seda et al. |
| 6,708,482 B2 | 3/2004 | Seda |
| 6,732,502 B2 | 5/2004 | Seda et al. |
| 6,883,303 B1 | 4/2005 | Seda |
| 6,896,475 B2 | 5/2005 | Graziosi et al. |
| 7,137,245 B2 | 11/2006 | Graziosi et al. |
| 7,762,509 B2 * | 7/2010 | Dierberger ............... 248/288.31 |
| 2006/0069533 A1 | 3/2006 | Florea et al. |
| 2007/0207035 A1 | 9/2007 | Girgis et al. |
| 2007/0231134 A1 | 10/2007 | Kumar et al. |
| 2007/0237635 A1 | 10/2007 | Nagendra et al. |
| 2007/0261411 A1 | 11/2007 | Nagendra et al. |
| 2008/0022692 A1 | 1/2008 | Nagendra et al. |
| 2008/0134688 A1 | 6/2008 | Nagendra et al. |

FOREIGN PATENT DOCUMENTS

GB  1401017  7/1975

* cited by examiner

*Primary Examiner* — David S Blum
(74) *Attorney, Agent, or Firm* — Kinney & Lange, P.A.

(57) ABSTRACT

A transition duct assembly for a gas turbine engine includes an outer diameter surface and an inner diameter surface. A substantially annular flowpath having a radial offset is defined between the inner diameter surface and the outer diameter surface. A curvature distribution of the inner diameter surface includes a first region of increasing slope in a radial direction and a second region of decreasing slope in the radial direction adjacent to and downstream of the first region. The first and second regions are configured to reduce flow separation along the outer diameter surface of fluid traveling along the substantially annular flowpath.

12 Claims, 3 Drawing Sheets

SEPARATION-RESISTANT INLET DUCT FOR MID-TURBINE FRAMES

BACKGROUND

The present invention relates to ducts for gas turbine engines, and more particularly to configurations of mid-turbine frame ducts for gas turbine engines.

In some gas turbine engines, a mid-turbine frame is utilized between turbine stages, such as between a high-pressure turbine (HPT) stage and a low-pressure turbine (LPT) stage. The mid-turbine frame includes a vane that guides combustion gases as they pass through the duct. The vane can comprise or envelop a strut that provides engine structural support that can be used, for instance, to connect the gas turbine engine to an aircraft. In some gas turbine engines, a flowpath radial offset is desired, with the radial offset initiated as close as possible downstream of the HPT blades. In order to provide such a radial offset, an annular duct formed at the mid-turbine frame induces a radial offset of combustion gases passing between the HPT and LPT stages, that is, an increase in radius in the downstream direction.

A problem encountered with mid-turbine frames is the tendency for the radial offset of the duct to cause flow diffusion. Flow diffusion can cause combustion gas flow in the duct to separate from boundary wall surfaces of the duct, causing fluid mixing and relatively high aerodynamic losses. It is desirable to reduce such flow separation and reduce aerodynamic losses.

SUMMARY

A transition duct assembly for a gas turbine engine includes an outer diameter surface and an inner diameter surface. A substantially annular flowpath having a radial offset is defined between the inner diameter surface and the outer diameter surface. A curvature distribution of the inner diameter surface includes a first region of increasing slope in a radial direction and a second region of decreasing slope in the radial direction adjacent to and separation along the outer diameter surface of fluid traveling along the substantially annular flowpath.

DETAILED DESCRIPTION

In general, the present invention provides a mid-turbine frame assembly for a gas turbine engine that includes a generally annular duct configured to reduce flow separation along a surface of the duct. In one embodiment, flow separation is reduced by providing a radially-outwardly extending bulge along a radially inner flowpath surface of the duct at or near a leading edge of an airfoil portion of a mid-turbine frame vane.

Figure 1:
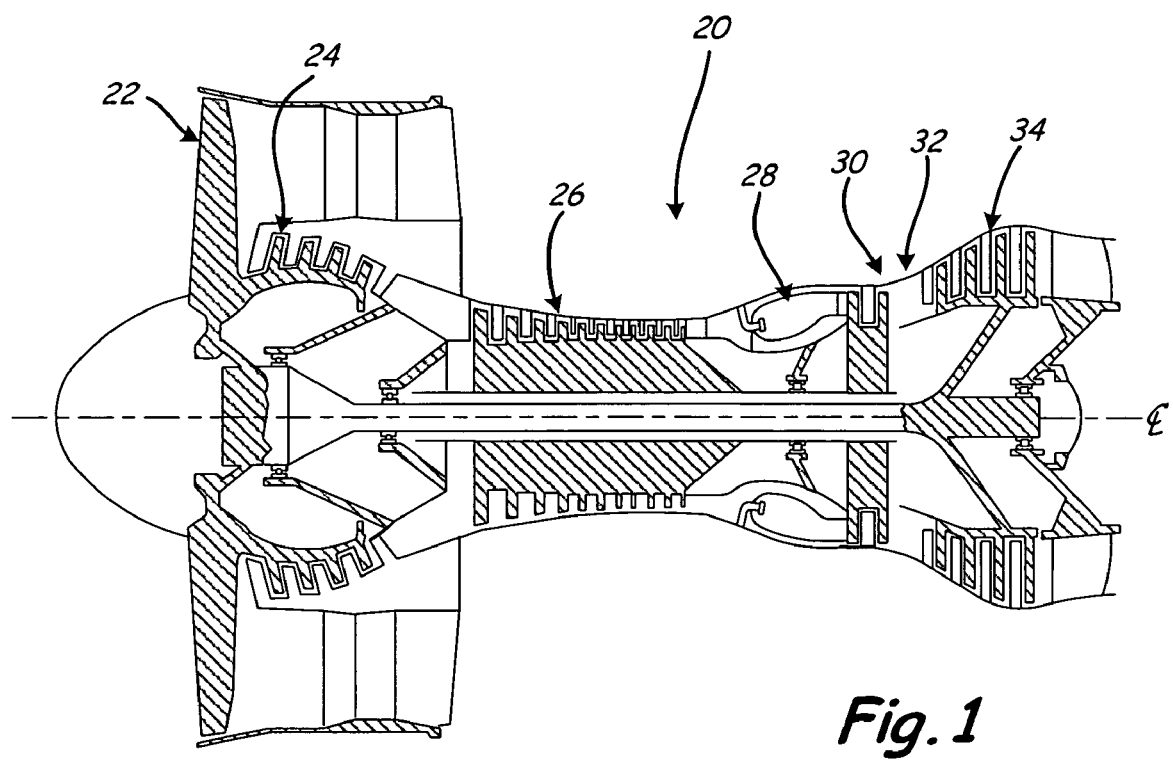
FIG. 1 is a schematic cross-sectional view of a gas turbine engine.

FIG. 1 is a schematic cross-sectional view of an exemplary two-spool gas turbine engine 20. The engine 20 includes a fan 22, a low-pressure compressor (LPC) section 24, a high-pressure compressor (HPC) section 26, a combustor assembly 28, a high-pressure turbine (HPT) section 30, a mid-turbine frame 32, and a low-pressure turbine (LPT) section 34 all arranged about an engine centerline $C_L$. The general construction and operation of gas turbine engines is well-known in the art, and therefore further discussion here is unnecessary. It should be noted, however, that the engine 20 is shown in FIG. 1 merely by way of example and not limitation. The present invention is also applicable to a variety of other gas turbine engine configurations.

Figure 2:
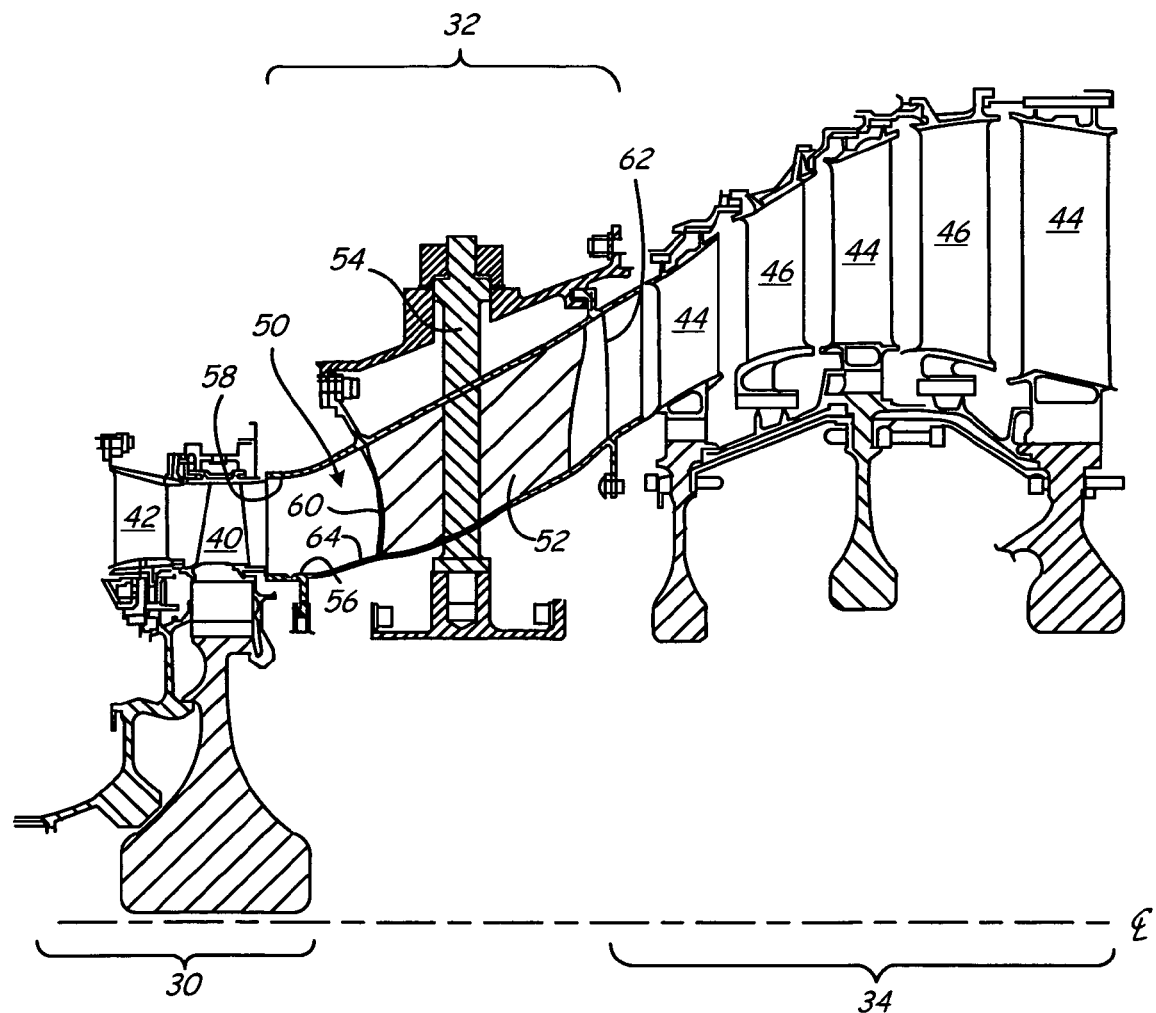
FIG. 2 is a cross-sectional view of a portion of the gas turbine engine.

FIG. 2 is a cross-sectional view of a portion of the gas turbine engine 20 near the mid-turbine frame 32. As shown in FIG. 2, the HPT section 30 includes a number of rotating blades 40 and a number of non-rotating vanes 42, and the LPT section 34 includes a number of rotating, shrouded blades 44 and a number of non-rotating vanes 46. It should be noted that the present invention is applicable to engine that utilize shrouded and/or unshrouded airfoils. The mid-turbine frame assembly 32 includes a duct 50, a number of non-rotating vanes 52 (only one vane 52, shown in partial cross-section is visible in FIG. 2), and a strut 54. The components of the mid-turbine frame assembly can be formed of a metallic material, such as a nickel- or cobalt-base superalloy.

The duct 50 includes an inner diameter wall surface 56 and an outer diameter wall surface 58. A generally annular combustion gas flowpath is defined between the inner and outer diameter wall surfaces 56 and 58 of the duct 50 about the engine centerline $C_L$. Moreover, the inner and outer diameter wall surfaces 56 and 58 of the duct 50 define a radial offset in the flowpath, whereby the flowpath moves radially outward in the downstream direction. It is generally desired to provide a maximum radial offset in the shortest axial distance. However, in this regard fluid flow cannot turn too quickly through the duct 50, a problem known as "rolloff", which is a limiting factor on the radial offset of the duct 50. The duct 50 can be formed from a plurality of discrete sections positioned adjacent one another (e.g., circumferentially, axially, etc.) to form the generally annular flowpath.

The vanes 52 of the mid-turbine are airfoil-shaped and arranged as a cascade in order to guide airflow passing through the duct 50, though only one vane 52 is visible in the cross-section of FIG. 2. Each vane 52 has a leading edge 60 and an opposite trailing edge 62. The particular aerodynamic shape of the vanes 52 can vary as desired for particular applications.

The inner diameter surface 56 of the duct 50 defines a bulge 64 extending into the generally annular flowpath in a radially outward direction (i.e., a protuberance or convex formation on the inner diameter surface 56 when viewed in cross-section). The bulge 64 is located at or near the leading edges 60 of the vanes 52. The bulge 64 causes the rate of flow area change of the duct 50 and its substantially annular flowpath to decrease adjacent to the leading edges 60 of the vanes 52, and the rate of flow area change of the duct 50 and its substantially annular flowpath increases at a second location downstream from the bulge 64. As used herein, the term flow area refers to the mean section determined on the basis of the average radial distance between the inner diameter surface 56 and the outer diameter surface 58 of the duct 50.

In the configuration illustrated in the exemplary embodiment in FIG. 2, the bulge 64 at the inner diameter surface 56 helps to improve flow quality through the duct, and can reduce flow separation along the outer diameter surface 58.

Figure 3:
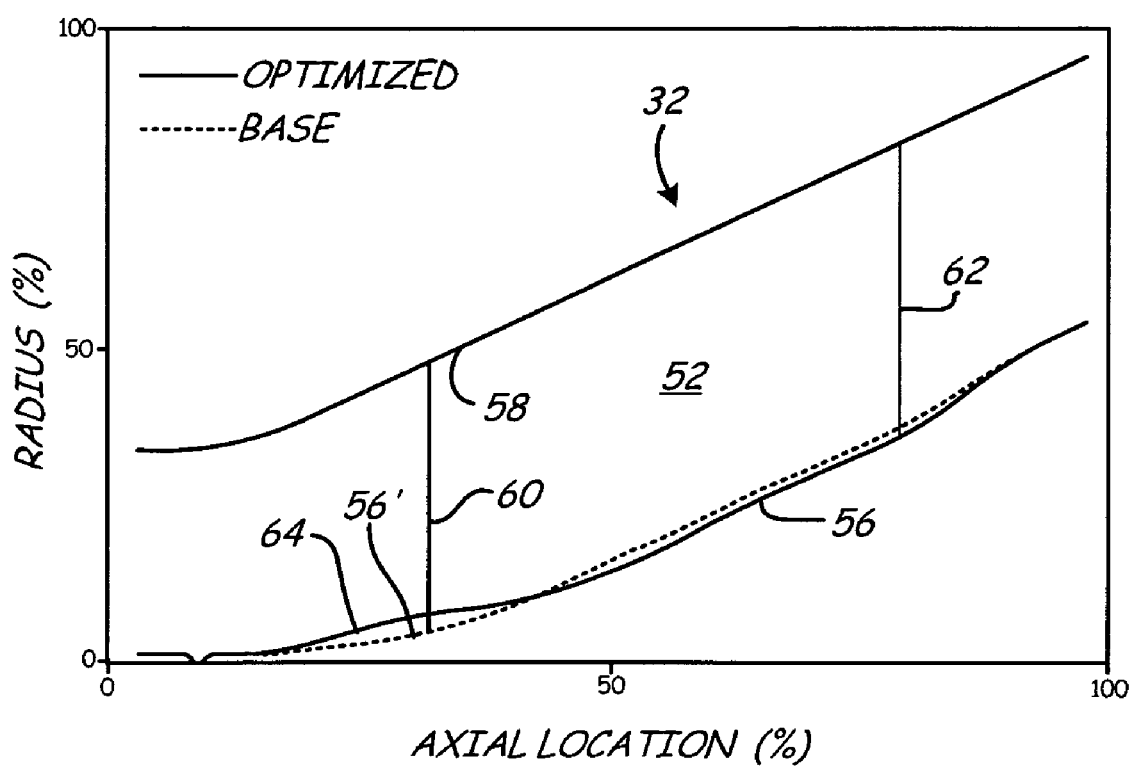
FIG. 3 is a graph illustrating a cross-sectional profile of a mid-turbine frame duct according to the present invention compared to another mid-turbine frame cross-sectional profile.

FIG. 3 is a graph illustrating a cross-sectional profile of an exemplary optimized mid-turbine frame assembly 32 according to the present invention compared to another mid-turbine frame cross-sectional profile. A percentage of illustrated radial distance (i.e., radial location %) is shown along the vertical axis, and a percentage of illustrated axial distance (i.e., axial location %) is shown along the horizontal axis. A base profile is shown with dashed lines representing inner diameter surface 56'. An exemplary optimized duct profile according to the present invention is shown with solid lines representing the inner and outer diameter surfaces 56 and 58, respectively. It should be noted that in alternative embodiments, the cross-sectional profile can vary from that illustrated in FIG. 3 depending upon factors such as the shape and arrangement of the vanes 52, the shape of the HPT blades 40, and other engine design and operational factors.

Although the present invention has been described with reference to preferred embodiments, workers skilled in the art will recognize that changes may be made in form and detail without departing from the spirit and scope of the invention.

What is claimed is:

1. A transition duct assembly for a gas turbine engine, the assembly comprising:
   an outer diameter surface; and
   an inner diameter surface, wherein a substantially annular flowpath having a radial offset is defined between the inner diameter surface and the outer diameter surface, and wherein a curvature distribution of the inner diameter surface includes a first region of increasing slope in a radial direction and a second region of decreasing slope in the radial direction adjacent to and downstream of the first region,
   wherein the first and second regions are configured to reduce flow separation along the outer diameter surface of fluid traveling along the substantially annular flowpath.

2. The assembly of claim 1 and further comprising:
   a mid-turbine frame vane extending between the inner diameter surface and the outer diameter surface, the mid turbine frame vane including an airfoil portion that defines a leading edge.

3. The assembly of claim 2, wherein a rate of change of a flow area of the substantially annular flowpath decreases at a first location adjacent to the leading edge of the airfoil of the mid-turbine frame vane, and wherein the rate of change of the flow area of the substantially annular flowpath increases at a second location downstream from the first location.

4. The assembly of claim 3, wherein the curvature distribution of the inner diameter surface defines an inflection point at a boundary between the first location and the second location.

5. A duct assembly for a gas turbine engine, the assembly comprising:
   a duct defining a generally annular flowpath, the duct comprising:
      a forward duct region that defines an increasing annular flowpath radius in an axially rearward direction; and
      a downstream duct region located adjacent to and rearward of the forward duct region, wherein the downstream duct region defines a bulge extending into the generally annular flowpath.

6. The assembly of claim 5, wherein the bulge comprises an inner diameter surface bulged radially outward.

7. The assembly of claim 5 and further comprising:
   a mid-turbine frame vane positioned at the downstream duct region.

8. The assembly of claim 7, wherein a leading edge of the mid-turbine frame vane is positioned at the region that is concave radially inward in the downstream duct region.

9. The assembly of claim 5, wherein a rate of change of a flowpath area within the duct decreases at the bulge of the inner diameter surface.

10. A gas turbine engine assembly comprising:
    a first turbine section;
    a second turbine section located downstream of the first turbine section;
    a mid-turbine frame assembly located between the first and second turbine sections, the mid-turbine frame assembly comprising:
       a duct comprising:
          an outer diameter surface; and
          an inner diameter surface, wherein a substantially annular flowpath having a radial offset is defined between the inner diameter surface and the outer diameter surface, and wherein a bulge along the inner diameter surface extends radially outward into the substantially annular flowpath,
          wherein the bulge is configured to reduce flow separation along the outer diameter surface of fluid traveling along the substantially annular flowpath; and
       a vane extending between the inner and outer diameter surfaces of the duct.

11. The assembly of claim 10, wherein a leading edge of the mid-turbine frame vane is positioned at the bulge in the downstream duct region.

12. The assembly of claim 10, wherein a rate of change of a flowpath area within the duct decreases at the bulge of the inner diameter surface.

* * * * *